(12) United States Patent
Turner et al.

(10) Patent No.: US 6,470,228 B1
(45) Date of Patent: Oct. 22, 2002

(54) MATERIAL MANAGEMENT SYSTEM AND METHOD

(75) Inventors: Greg A. Turner, Arlington; Douglas K. Wolfe, Denton; Patrick S. Porowski, Duncanville; William Bruce Webster, Carrollton, all of TX (US)

(73) Assignee: Vought Aircraft Industries, Inc., Dallas, TX (US)

( * ) Notice: Subject to any disclaimer, the term of this patent is extended or adjusted under 35 U.S.C. 154(b) by 0 days.

(21) Appl. No.: 09/339,334

(22) Filed: Jun. 23, 1999

(51) Int. Cl.[7] .................. G05B 19/416; G06F 17/16
(52) U.S. Cl. .................. 700/97; 700/98; 700/107
(58) Field of Search ................. 700/97–99, 122, 700/145, 157, 131, 134, 143, 167, 182, 216, 106, 107; 705/28–29

(56) References Cited

U.S. PATENT DOCUMENTS

| | | | |
|---|---|---|---|
| 3,477,322 A | 11/1969 | Gerber et al. ............... 83/71 |
| 3,875,389 A | 4/1975 | McFadden et al. ......... 235/151 |
| 4,554,635 A | * 11/1985 | Levine ..................... 700/167 |
| 4,598,376 A | 7/1986 | Burton et al. .............. 364/470 |
| 4,725,961 A | 2/1988 | Pearl ....................... 364/475 |
| 4,847,778 A | 7/1989 | Daley ................... 364/474.22 |
| 4,864,507 A | * 9/1989 | Ebling et al. ............... 700/99 |
| 4,941,183 A | 7/1990 | Bruder et al. ................ 382/8 |
| 5,089,971 A | 2/1992 | Gerber ..................... 364/470 |
| 5,317,516 A | 5/1994 | Taijonlahti et al. ......... 364/468 |
| 5,570,292 A | 10/1996 | Abraham et al. ........ 364/473.01 |
| 5,596,502 A | 1/1997 | Koski et al. ............ 364/468.01 |
| 5,812,402 A | * 9/1998 | Nishiyama et al. ........... 700/97 |
| 5,889,926 A | * 3/1999 | Bourne ..................... 700/255 |
| 6,009,406 A | 12/1999 | Nick ........................ 705/10 |
| 6,144,890 A | * 11/2000 | Rothkop .................... 700/97 |
| 6,173,210 B1 | 1/2001 | Bjornson et al. ............ 700/99 |
| 6,314,334 B1 | * 11/2001 | Berlin et al. ............... 700/134 |

OTHER PUBLICATIONS

PCT Written Opinion (PCT Rule 1.1), mailed May 2, 2001 re International Application PCT/US00/16531 filed Jun. 13, 2000 (Applicant's reference 068525.0125).

* cited by examiner

*Primary Examiner*—Leo Picard
*Assistant Examiner*—Alexander Kosowski
(74) *Attorney, Agent, or Firm*—Baker Botts L.L.P.

(57) ABSTRACT

A material management system and method (10) includes a data storage device (20) containing order information (24) for a product, product information (26) for a product, work center information (28) for fabricating the product, and inventory information (30) for fabricating the product. The system (10) also includes a processor (12) coupled to the data storage device (20). The system (10) further includes a nesting application (22) operable for execution by the processor (12). The nesting application (22) is operable to determine a fabrication nest for the product using the order information (24), the product information (26), the work center information (28), or the inventory information (30).

37 Claims, 4 Drawing Sheets

MATERIAL MANAGEMENT SYSTEM AND METHOD

TECHNICAL FIELD OF THE INVENTION

This invention relates in general to the field of manufacturing, and more particularly, to a material management system and method.

BACKGROUND OF THE INVENTION

Manufacturing operations generally require purchasing and maintaining an inventory of material for fabricating products. Efficient use of the material inventory generally reduces costs associated with fabricating the products. One example of a material management system for efficient use of material inventory utilizes visual product representations stored in a computer memory. An operator of the system may select one or more of the product representations to be displayed on a computer screen where the operator may interactively arrange the product representations into an acceptable layout or fabrication nest for a particular size of material to optimize use of the material. The fabrication nest may then be stored in the computer and used in fabricating the products from the material.

Additionally, computer systems are generally used in material management systems for tracking the material inventory throughout the manufacturing operations so that additional material may be purchased and received to meet manufacturing or delivery schedules. For example, various types, sizes and thicknesses of material may be required to support manufacturing various products. The computer systems may be generally used for determining the material that has been removed from inventory to support the fabrication of one or more products and determining the material that remains in inventory to support future fabrication requirements.

However, prior material management systems generally require time consuming manual manipulation of the product representations for determining the fabrication nest for a particular size of material. Additionally, changes in the material size used to fabricate the products generally require determining a new fabrication nest to accommodate the change in material size. Further, selection of the visual product representations for determining the fabrication nest may not provide for optimum use of the material inventory or optimum use of other aspects of the manufacturing operations.

SUMMARY OF THE INVENTION

Accordingly, a need has arisen for an improved material management system and method.

In accordance with the teachings of the present invention, a material management system and method are provided that address disadvantages and problems associated with prior art material management systems and methods. According to one embodiment of the present invention, a material management system comprises a data storage device containing order information for a product, product information for the product, work center information for fabricating the product, and inventory information for fabricating the product. The material management system also includes a processor coupled to the data storage device. The material management system further includes a nesting application operable for execution on the processor and for determining a fabrication nest for the product using the order information, the product information, the work center information, and the inventory information.

According to another embodiment of the invention, a method for material management comprises retrieving order information for a product from a data storage device, retrieving product information for the product from the data storage device, and retrieving work center information for fabricating the product from the data storage device. The method also includes retrieving inventory information for fabricating the product. The method further includes determining a fabrication nest for the product using the order information, the product information, the work center information, and the inventory information.

Embodiments of the invention provide several technical advantages. For example, one embodiment of the invention provides a material management system that determines a fabrication nest by coordinating open orders for the products, the material inventory used in making the products, and the work centers used for fabricating the products to efficiently manage and use material inventory. Additionally, because the invention utilizes work center information to determine the fabrication nest, products may be fabricated more efficiently without time consuming work center tooling changes.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions, taken in conjunction with the accompanying drawings in which.

DETAILED DESCRIPTION OF THE INVENTION

The preferred embodiment of the present invention and its advantages are best understood by referring to FIGS. 1 through 4 of the drawings, like numerals being used for like and corresponding parts of the various drawings.

Figure 1:
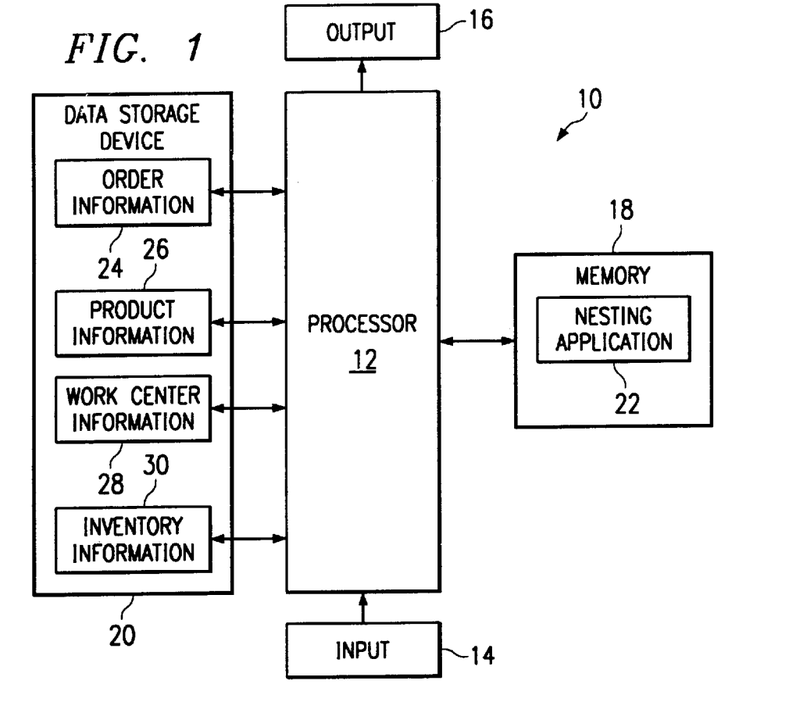
FIG. 1 is an example material management system in accordance with an embodiment of the present invention.

FIG. 1 is an example material management system 10 in accordance with an embodiment of the present invention. In this embodiment, material management system 10 comprises a processor 12, an input device 14, an output device 16, a memory 18, and a data storage device 20. The present invention includes computer software that may be stored in memory 18 and executed by processor 12. The computer software may also be stored in a variety of other types of storage media including, but not limited to, floppy disk drives, hard drives, CD ROM disk drives, or magnetic tape drives.

Processor 12 may comprise a computer, workstation, such as a UNIX workstation, mini-computer, mainframe or other computing device associated with a volatile or non-volatile memory 18, input device 14, and output device 16. Data or information may be received from a user of material management system 10 using a keyboard or any other type of input device 14. Results may be output to a user of material management system 10 through output device 16, which may include a display, printer, or any other type of output device, or may be output to other applications.

Material management system 10 includes nesting application 22, which is a computer software program. In FIG. 1, nesting application 22 is illustrated as being stored in memory 18, where it can be executed by processor 12. Nesting application 22 may also be stored on a variety of other types of storage media. Nesting application 22 processes information from data storage device 20 and evaluates the information to determine a product layout or fabrication nest for fabricating one or more products. In the embodiment illustrated in FIG. 1, data storage device 20 includes order information 24, product information 26, work center information 28, and inventory information 30. Order information 24, product information 26, work center information 28, and inventory information 30 may be stored in a single data storage device 20 or may be stored in separate data storage devices 20. For example, information contained in data storage device 20 may be stored in memory 18 or on a server in a client-server environment. Data storage device 20 may include information stored or contained in databases, applications, systems, subsystems or other computer information sources. For example, three-dimensional characteristics of a product may be stored in a database or retrieved from a product design application, such as a CATIA design system application.

In the embodiment illustrated in FIG. 1, processor 12 accesses information or data from data storage device 20. Nesting application 22 evaluates the information retrieved from data storage device 20 and determines a fabrication nest for fabricating one or more products. Nesting application 22 may determine the fabrication nest using order information 24, product information 26, work center information 28, and/or inventory information 30.

Order information 24 may include information for one or more products. For example, order information 24 may include information such as open work order requests and work order numbers for a product, a material code associated with a particular material used in fabricating products, the quantity of products required, work center requirements for fabricating the products, work center tooling requirements for fabricating the products, a schedule designating a required completion date for the products, a charge number for associating the cost to fabricate the products, and status information pertaining to open work order requests. Order information 24 may also contain other information associated with orders for the products.

Product information 26 may include information associated with attributes or product definition data for the products. For example, product information 26 may include geometric data of the product, such as three-dimensional geometric characteristics and two-dimensional projections of the product. Product information 26 may also include the material requirements for the product, such as material properties, material grain or warp direction, numerically controlled programming for fabricating or machining the product, a part number for the product, work center information for fabricating the product, and revision or release information associated with the product. Product information 26 may also contain other attributes or product definition data associated with the products.

Work center information 28 may include information associated with one or more work centers. Work centers may be used for material preparation and/or fabrication of the products. Work center information 28 may include information pertaining to constraints of work holding devices, such as holding and positioning attributes. For example, work center information 28 may include hold-down locations and frequency, vacuum groove locations, and the like. Additionally, work center information 28 may include information pertaining to speed and feed rates of devices used for fabricating the products and manufacturing tools used for manufacturing the product. Work center information 28 may also contain other information associated with the work centers used for fabricating the products and preparing material for product fabrication.

Inventory information 30 may include information pertaining to material used for fabricating the products. Inventory information 30 may include material information such as the alloy, temper, type, grain direction, and gage of materials available or required to meet the product manufacturing requirements. Inventory information 30 may also include length, width, quantity, and certification information of the material. Inventory information 30 may also include warp and ribbon direction information pertaining to composite manufacturing materials.

Generally, processor 12 may retrieve order information 24 associated with open orders or requests for products. Order information 24 may contain open orders for one or more of a single product or open orders for one or more different products. Processor 12 may then retrieve product information 26 for the ordered products. Processor 12 may also retrieve work center information 28 for work centers associated with fabricating the ordered products. As previously described, order information 24 and product information 26 may also designate one or more particular work centers for fabricating one or more of the ordered products. Processor 12 may also retrieve inventory information 30 pertaining to material used for fabricating the ordered products. Nesting application 22 may determine a fabrication nest for the ordered products using order information 24, product information 26, work center information 28, and/or inventory information 30.

In operation, predetermined nesting criteria may be used for determining a fabrication nest for products using nesting application 22. For example, order information 24 may include open orders for one or more products. Order information 24 may also include a schedule designating the ordered products to be complete by a specified date. Predetermined nesting criteria may be used to designate primary considerations for determining a fabrication nest for the products using nesting application 22. Thus, if schedule is selected as the nesting criteria, nesting application 22 determines a fabrication nest for the ordered products using the schedule as the primary nesting consideration. However, as described in greater detail below, other nesting criteria may be selected for determining a fabrication nest using nesting application 22. Nesting criteria may also be a combination of predetermined considerations for determining the fabrication nest. Material management system 10 may also be configured to provide selection of the nesting criteria by an operator of material management system 10.

After retrieving order information 24, processor 12 may retrieve product information 26 for the ordered products. For example, processor 12 may retrieve part definition data for the ordered products, such as material type required for fabricating the ordered products, two-dimensional projections for each of the ordered products, three-dimensional geometric characteristics for each of the ordered products, and numerically controlled machining programs for each of the ordered products.

Processor 12 may also retrieve work center information 28 associated with work centers used for fabricating the ordered product or preparing the material for product fabrication. For example, one or more work centers may have the capacity or capability for fabricating the ordered products. Additionally, order information 24 or product information 26 may designate particular work centers for fabricating the products. Work center information 28 may also include constraints of work holding devices, such as holding and positioning attributes of tooling fixtures used during fabrication of the ordered products.

Processor 12 may also retrieve inventory information 30 for fabricating the ordered products. Inventory information 30 may include material information such as alloy, temper, type, grain direction, and gage of materials available for fabricating the ordered products. Inventory information 30 may also include material information such as the length, width, grain direction, certifications, and quantity of material available for fabricating the ordered products.

After processor 12 retrieves order information 24, product information 26, work center information 28, and/or inventory information 30, nesting application 22 may determine a fabrication nest for the ordered products using the nesting criteria. For example, if schedule is designated as the nesting criteria, nesting application 22 determines a fabrication nest for the ordered products using schedule information as the primary consideration for determining the fabrication nest.

Nesting application 22 may determine the fabrication nest for the ordered products by correlating order information 24, product information 26, work center information 28, and/or inventory information 30. For example, if schedule is the nesting criteria for determining a fabrication nest, nesting application 22 determines the fabrication nest using primarily ordered products having earlier completion dates. Nesting application 22 uses work center information 28 for determining work centers available for fabricating the ordered products and constraints of the work holding devices associated with fabricating any of the ordered products.

Nesting application 22 may also use product information 26 for the ordered products for determining the fabrication nest. For example, two-dimensional projections for the ordered products contained in product information 26 may be used for determining the fabrication nest. Additionally, nesting application 22 correlates product information 26 with work center information 28. For example, nesting application 22 correlates work center information 28, such as tooling hole locations and patterns, with the two-dimensional projections for the ordered products for determining the fabrication nest.

Nesting application 22 may also use inventory information 30 for determining the fabrication nest. For example, nesting application 22 may correlate product information 26 for the ordered products, such as the type of material required for fabricating each of the ordered products, with inventory information 30, such as the alloy, temper, type, grain direction, and gage of materials available for fabricating the ordered products, for determining the fabrication nest.

Nesting application 22 may also determine more than a single fabrication nest to support the schedule nesting criteria. For example, products having earlier scheduled completion dates may require different types of material or different work centers for fabrication. Thus, nesting application 22 may determine more than one fabrication nest with each fabrication nest including similar products having similar constraints. Additionally, products having later scheduled completion dates may be nested with the products having earlier scheduled completion dates to optimize usage of material inventory.

Nesting application 22 may also correlate inventory information 30 with work center information 28 for determining the fabrication nest. For example, work centers and work holding devices may be capable of accepting particular sizes of material for fabricating products. Thus, nesting application 22 may correlate inventory information 30 with the work center information 28 for determining the fabrication nest.

Therefore, material management system 10 provides greater efficiency than prior material management systems by correlating order information 24, product information 26, work center information 28, and inventory information 30 for efficient use and management of material throughout manufacturing operations.

Additionally, material management system 10 may be used for determining long-term material requirements for supporting manufacturing operations. For example, long-term material forecasting may be determined using material management system 10 by determining fabrication nests based on required products over a selected period of time or according to anticipated product orders. For example, nesting application 22 may be used to determine fabrication nests for all products requiring fabrication by a particular date. Material requirements for the fabrication nests may be transmitted to material vendors for supplying the required materials for the fabrication nests to meet the manufacturing schedule. Additionally, precise material requirements may be specified to the material vendor based on the fabrication nests determined using nesting application 22, thereby reducing the cost associated with manufacturing the products.

Material management system 10 also provides a greater flexibility than prior material management systems by allowing various nesting criteria to be used for determining the fabrication nest using nesting application 22. For example, as described above, nesting criteria such as manufacturing schedule may be used for determining the fabrication nest using nesting application 22. However, other nesting criteria may also be used for determining fabrication nests for products. For example, nesting criteria may include a particular work center or work holding device for fabricating products in order to reduce costs associated with modifying work center constraints. Additionally, an operator may have the option of selecting a nesting criteria to be used for determining a fabrication nest using input device 14. In this example, the operator may designate a particular work center or work holding device as nesting criteria for the fabrication nest. Therefore, nesting application 22 uses the specified work center constraints as primary considerations for determining a fabrication nest for the products.

Additionally, nesting criteria may include material information for determining a fabrication nest using nesting application 22. For example, an operator using material management system 10 may designate a particular alloy, temper, type, grain direction, or gauge of material as the nesting criteria. Thus, nesting application 22 determines a fabrication nest by correlating the material nesting criteria with order information 24, product information 26, and work center information 28 for determining the fabrication nest.

Nesting criteria may also require determining a fabrication nest within a specified period of time. For example, increased material options, work center options, and/or product selections may result in an increase in time required for nesting application 22 to determine a fabrication nest. An operator of material management system 10 may have the option of selecting a time period using input device 14 for the nesting criteria. Therefore, nesting application 22 determines a fabrication nest within the specified time period.

Thus, material management system 10 provides greater flexibility than prior material management systems by determining fabrication nests for products using a variety of nesting criteria as the primary consideration for determining the fabrication nest. Additionally, for example, particular products may be selected as nesting criteria for determining a fabrication nest using nesting application 22. For example, order information 24 may not reflect a new product, a new design of a product, or a product shortage requiring expedited fabrication. An operator may designate a particular product or products as nesting criteria for determining a fabrication nest using nesting application 22. Thus, nesting application 22 determines a fabrication nest using the product shortage nesting criteria as a primary consideration for determining a fabrication nest.

Figure 2:
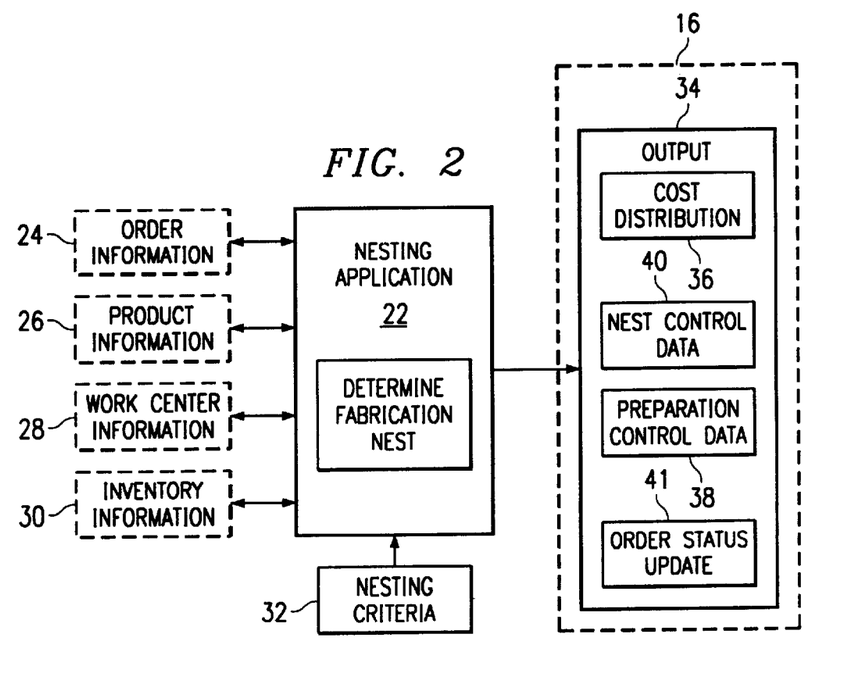
FIG. 2 is an example material management system in accordance with an embodiment of the present invention.

FIG. 2 is an example material management system 10 in accordance with an embodiment of the present invention. After retrieving order information 24, product information 26, work center information 28, and inventory information 30, nesting application 22 determines a fabrication nest for products. Nesting application 22 may use predetermined nesting criteria 32 for determining the fabrication nest. Nesting application 22 may also receive nesting criteria 32 from an operator of material management system 10 using input device 14. For example, the operator may specify particular products, a particular material, or other constraints to be used as primary considerations for determining the fabrication nest.

After determining a fabrication nest for the products, nesting application 22 outputs information pertaining to the fabrication nest. Output of information pertaining to a fabrication nest is identified in FIG. 2 as output 34. Output 34 may be in the form of a display, printed output, or any other output media. The output 34 illustrated in FIG. 2 includes a cost distribution 36, preparation control data 38, and nest control data 40. However, output 34 may also contain other information pertaining to the fabrication nest. Additionally, output 34 may also be transmitted directly to manufacturing processing equipment or applications.

Cost distribution 36 of output 34 may include information associated with costs for manufacturing each of the products contained in the fabrication nest. For example, cost distribution 36 may include a labor or production cost distribution. The production cost distribution may include costs associated with the fabrication processes or fabrication time required for a particular product. For example, time spent for milling operations, drilling operations, or other fabrication operations may be recorded and used for apportioning production costs to each product of the fabrication nest. The production costs may then be associated with a corresponding charge number associated with the product. Processor 12 may update order information 24 using cost distribution 36 for maintaining costs associated with each product contained in the fabrication nest.

Cost distribution 36 may also include a material cost distribution for the products included in the fabrication nest. The cost of a particular stock size of material used for the fabrication nest may be apportioned to each of the products contained in the fabrication nest based on attributes of each product, such as the area, volume, or weight of the finished product. For example, inventory information 30 and product information 26 may be used for determining a cross-sectional area or volume for each product contained in the fabrication nest. Thus, the cost of the material used for the fabrication nest may be apportioned to each product contained in the fabrication nest. Processor may update order information 24 to reflect the material cost distribution for maintaining costs associated with each product of the fabrication nest products.

Preparation control data 38 of output 34 may include information pertaining to preparation of the material used for the fabrication nest. For example, nesting application 22 determines the fabrication nest for the products. The fabrication nest may include an outer boundary for each product contained in the fabrication nest allowing the manufacture of the product while preventing interference with an adjacent nested product. Preparation control data 38 may include entry hole locations internal to the outer boundary of each product providing an entry location for manufacturing processing equipment for fabricating each of the nested products. The location and size of the entry holes may be determined using product information 26. For example, the size of the entry holes may be determined using numerically controlled programming information for fabricating the product based on the processing equipment required to fabricate the product.

Preparation control data 38 may also contain information pertaining to manufacturing operations performed on the material used in the fabrication nest prior to fabricating each product. For example, preparation control data 38 may include information pertaining to milling requirements for reducing the thickness of the material to accommodate smaller thickness products, tooling hole locations used for attaching the material to a work center holding device, and/or entry hole locations for initial fabrication operations. Preparation control data 38 may be output to a display, printed output, or other type of output device 16. Preparation control data 38 may also be transmitted directly to a work center used for preparing the material for the fabrication nest.

Nest control data 40 of output 34 may include information pertaining to the fabrication of each of the products contained in the fabrication nest. For example, product information 26 may include numerically controlled programming information relating to the fabrication of each of the products contained in the fabrication nest. Nesting application 22 may retrieve the numerically controlled programming information for each of the products contained in the fabrication nest and combine, concatenate, and/or create the numerically controlled programming for each product to determine numerically controlled programming for the fabrication nest. For example, nesting application 22 may configure the numerically controlled programming for the fabrication nest to optimize usage of a particular fabrication process or device during fabrication of the products to minimize tooling changes during fabrication of the products. Therefore, nesting application 22 may be used to decrease costs associated with manufacturing the products contained in the fabrication nest by determining an efficient processing program for the fabrication nest.

Nest control data 40 may also include the work center equipment required to produce the products from the fabrication nest, the products contained in the fabrication nest, the stock size of material required for the fabrication nest, information for creating a graphical representation of the fabrication nest, and identification information for the fabrication nest and each product contained in the fabrication nest. For example, nesting application 22 may generate an identifier for a fabrication nest and each product contained in a particular fabrication nest. A corresponding identifier may be attached to the material designated for the fabrication nest, such as a bar code symbol or other identification symbol, and to each product produced from the fabrication nest.

Additionally, an operator may use the identifier attached to the material to obtain or request information pertaining to a corresponding fabrication nest. For example, an operator may read an identifier attached to the material, such as scanning a barcode symbol, to retrieve preparation control data 38 and/or nest control data 40 associated with the fabrication nest. The fabrication nest may also be displayed to the operator using output device 16. The operator may also have the option of controlling the manufacturing processing stages to be completed using the preparation control data 38 or the nest control data 40. For example, preparation control data 38 may include information pertaining to entry hole locations to be drilled in the material and milling operations to be performed to reduce the thickness of the material in preparation for fabricating the products. The operator may have the option of designating the order of the processing stages defined by preparation control data 38.

Nest control data 40 may be output to a display, printing device, or other type of output device 16. Nest control data 40 may also be transmitted directly to a work center used in fabricating products from the fabrication nest. For example, an operator of material management system 10 may use input device 14 to request transmittal of nest control data 40 in preparation for fabricating the products using the fabrication nest. The operator may also use input device 14 to request transmittal of preparation control data 38 to a work center for preparation of the material to be used for the fabrication nest. Material management system 10 may also be configured to automatically transmit preparation control data 38 and nest control data 40 to work centers after determination of the fabrication nest.

After nesting application 22 determines a fabrication nest for one or more products, nesting application 22 generates an order status update 41. Order status update 41 may be used to update inventory information 30 to reflect material designated for fabrication of products contained in the fabrication nest. Additionally, inventory information 30 may be automatically updated each time a fabrication nest is modified to accommodate a change of products contained in the fabrication nest. For example, after a fabrication nest has been determined using nesting application 22, a product shortage may require a new fabrication nest reflecting incorporation of the shortage product. An operator of material management system 10 may use input device 14 to input the product shortage information as nesting criteria so that nesting application 22 can determine a new fabrication nest incorporating the shortage product. After nesting application 22 determines a new fabrication nest incorporating the shortage product, material management system 10 may automatically update inventory information 30 to reflect any change in material relative to the new fabrication nest.

Additionally, order status update 41 may be used to automatically update preparation control data 38 and nest control data 40 to reflect a modification to a fabrication nest. For example, an operator of material management system 10 may request a new fabrication nest using input device 14 incorporating the shortage product. After nesting application 22 determines a new fabrication nest incorporating the shortage product, nest control data 40 and preparation control data 38 may be automatically updated to reflect the new fabrication nest.

Order status update 41 may also be used to automatically update order information 24 to reflect products contained in the fabrication nest and to reflect products added or deleted from a prior fabrication nest. For example, nesting application 22 retrieves order information 24 to determine a fabrication nest for products having open order requests. However, a product shortage may require an operator of material management system 10 to override order information 24 so that the shortage products can be incorporated into a new fabrication nest to accommodate manufacturing requirements. After nesting application 22 determines a new fabrication nest incorporating the shortage products, order information 24 may be updated to reflect the open order products that were in the original fabrication nest but are not included in the new fabrication nest. Therefore, order information 24 may be automatically updated so that open order product information for the next fabrication nest accurately reflects current product schedule requirements.

Figure 3:
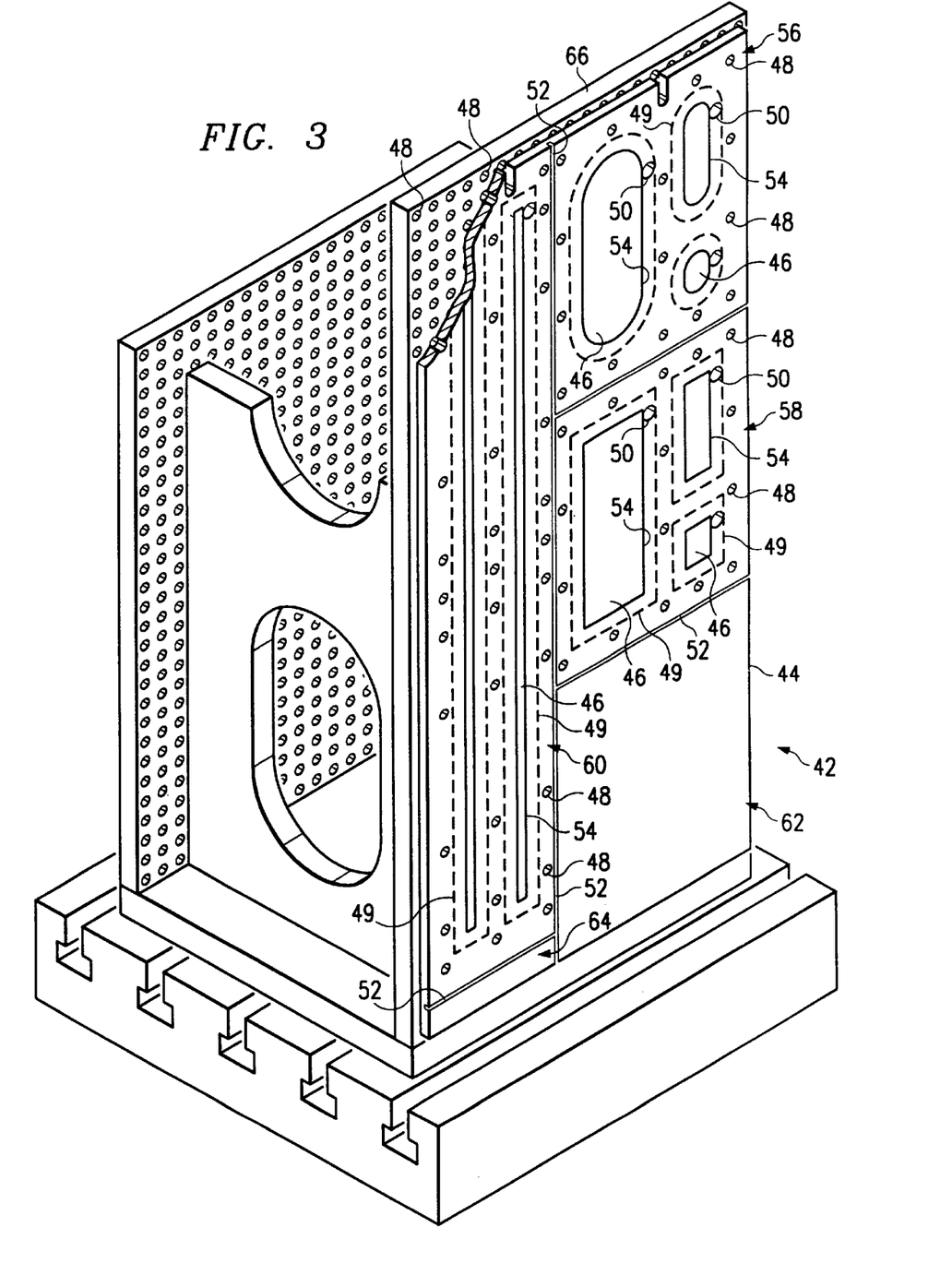
FIG. 3 is an example fabrication nest in accordance with an embodiment of the present invention.

FIG. 3 is an example fabrication nest 42 in accordance with an embodiment of the present invention. In this example, nesting application 22 determines fabrication nest 42 using a particular size of material 44. The particular size of material 44 may be selected as nesting criteria 32 for fabrication nest 42. Additionally, nesting application 22 may automatically select a particular size of material 44 for efficient usage of inventory material.

As illustrated in FIG. 3, nesting application 22 determines fabrication nest 42 for various products 46 based on efficient usage of inventory material for example. Products 46 may also be selected as nesting criteria 32 for determining fabrication nest 42. Order information 24 may be retrieved pertaining to open order requests for products 46 for determining fabrication nest 42. Information pertaining to products 46 may also be received from an operator of material management system 10 using input device 14.

Fabrication nest 42 illustrated in FIG. 3 includes tooling holes 48, outer boundaries 49, entry holes 50, a cutter path 52, and product boundaries 54. Nesting application 22 determines locations for tooling holes 48 using work center information 28. For example, various work holding devices may be suitable for fabricating products 46. However, each work holding device may have different holding and positioning attributes. The holding and positioning attributes for each work holding device may be stored as work center information 28. Thus, nesting application 22 may use work holding device constraints to determine a fabrication nest.

Additionally, an operator of material management system 10 may have the option of selecting a particular work holding device as nesting criteria 32 using input device 14. Thus, the holding and positioning attributes associated with the selected work holding device may be used for determining the fabrication nest.

Product boundaries 54 reflect the dimensions of products 46 contained in fabrication nest 42. For example, product boundaries 54 may include three-dimensional or two-dimensional characteristics of products 46 contained in product information 26. Outer boundaries 49 reflect portions of material 44 outside product boundaries 54 required for manufacturing products 46. For example, outer boundaries 49 may reflect areas of material 44 requiring removal during fabrication of products 46. Outer boundaries 49 may also reflect minimum areas outside product boundaries 54 required to enable access of devices used for fabricating products 46. Additionally, outer boundaries 49 may reflect locations and configurations of tooling tabs associated with products 46. Information pertaining to outer boundaries 49 may be stored as product information 26 and used by nesting application 22 for determining fabrication nest 42.

Entry holes 50 represent initial entry points for devices used for fabricating products 46. For example, manufacturing devices such as cutters, drills, saws or other manufacturing equipment may use entry holes 50 for initiating fabrication processes. In FIG. 3, entry holes 50 are located between outer boundaries 49 and product boundaries 54. Nesting application 22 may coordinate the locations of entry holes 50 with the locations of products 46 and the locations of tooling holes 48 to provide efficient usage of material 44 while preventing interference of entry holes 50 with locations of tooling holes 48.

Nesting application 22 may also be used to determine smaller fabrication nests for fabricating products 46 at various work centers. For example, efficient usage of a particular size or type of material may require nesting products that require fabrication using different work centers. Additionally, nesting criteria 32 may require that a fabrication nest include particular products to meet manufacturing schedules. However, the nested products may require different work centers for fabrication. Nesting application 22 may be used to determine a fabrication nest comprising several smaller fabrication nests associated with each of the various work centers.

For example, as illustrated in FIG. 3, fabrication nest 42 may include a fabrication nest 56, a fabrication nest 58, and a fabrication nest 60. Each fabrication nest 56, 58 and 60 may include products 46 requiring a different work center. Nesting application 22 may determine fabrication nests 56, 58 and 60 by segregating products 46 requiring different work centers. Nesting application 22 may also determine cutting path 52 for separating fabrication nests 56, 58 and 60. Thus, fabrication nests 56, 58 and 60 may be forwarded to different work centers for fabricating products 46 contained in each fabrication nest 56, 58 and 60.

Additionally, fabrication nest 42 may be combined with other fabrication nests to optimize material usage and to determine long term material requirement forecasting. For example, fabrication nest 42 may be combined with other fabrication nests to determine an efficient material size to produce to support long term material usage and optimize the amount of material produced.

Fabrication nest 42 may also include excess material areas 62 and 64 reflecting unused portions of material 44. For example, nesting criteria 32 may require particular products 46 to be fabricated to meet manufacturing schedules. Nesting application 22 may determine fabrication nest 42 for products 46 required to meet the manufacturing schedule while providing efficient usage of material 44. Thus, excess material areas 62 and 64 of material 44 may reflect unused portions of material 44.

Nesting application 22 may evaluate excess material areas 62 and 64 to determine whether excess material areas 62 and 64 may be used for producing additional products. Nesting application 22 may also determine modifications to excess material areas 62 and 64 required for fabricating additional products. Nesting application 22 may assign an identifier to excess material areas 62 and 64 so that excess material areas 62 and 64 may be returned to inventory and used for future fabrication nests. Processor 12 may also update inventory information 30 to reflect return of excess material areas 62 and 64 to inventory.

Nesting application 22 may also coordinate locations of tooling holes 48 in determining fabrication nest 42. For example, tooling holes 48 may be used to secure material 44 to a work holding device 66 during fabrication processes. Tooling holes 48 may also be used for handling and/or locating products 46 after fabrication operations. However, locations of tooling holes 48 may be different for each work holding device 66. Locations of tooling holes 48 for work holding devices 66 may be stored in work center information 28 and used by nesting application 22 for determining fabrication nest 42. For example, nesting application 22 may designate particular tooling holes 48 to be used for securing material 44 to work holding device 66 to prevent interference of tooling holes 48 with locations of products 46, entry holes 50, or cutting path 52.

Figure 4:
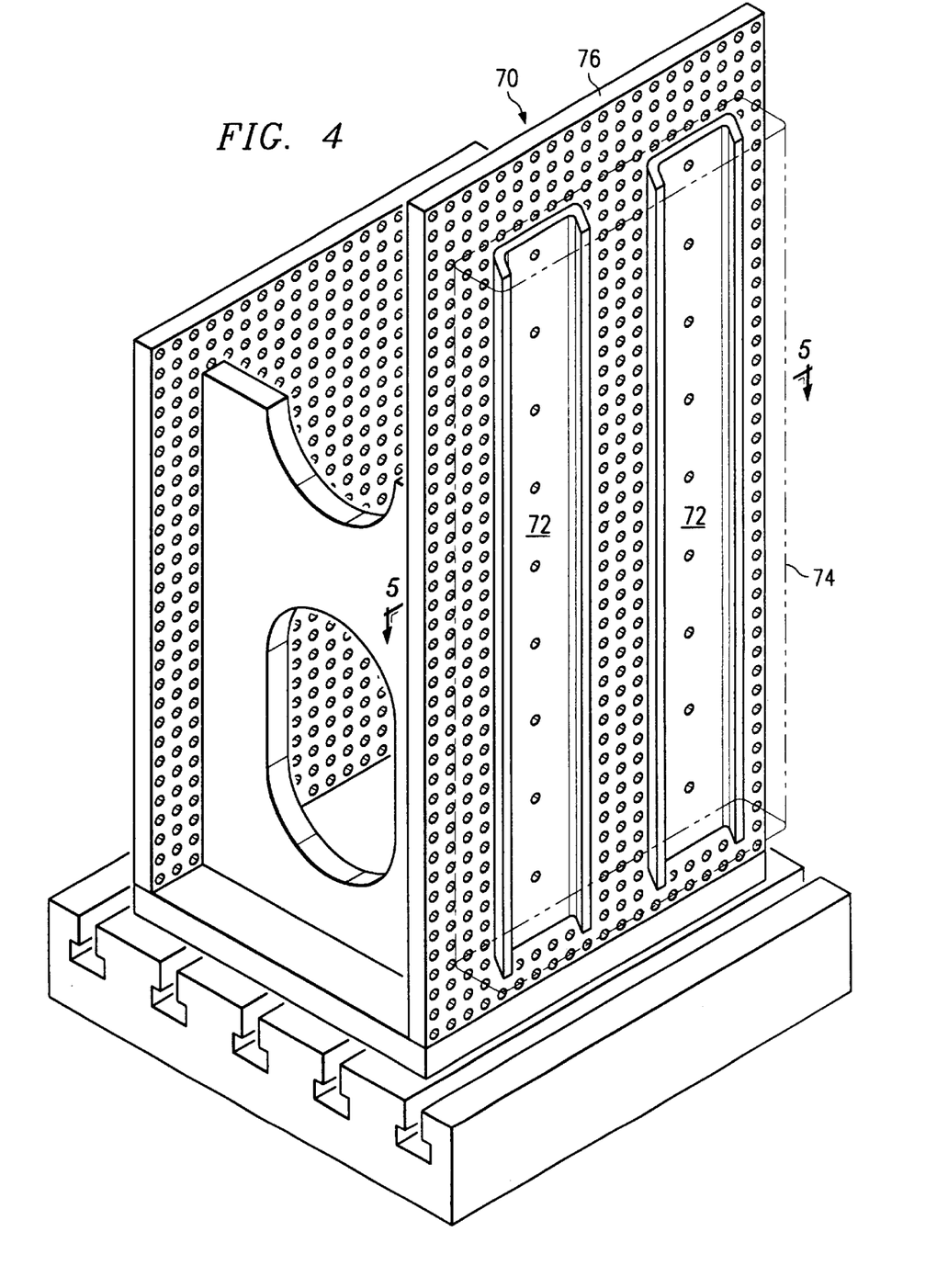
FIG. 4 is another example fabrication nest in accordance with an embodiment of the present invention.

FIG. 4 is another example fabrication nest 70 in accordance with an embodiment of the present invention. In this example, nesting application 22 determines fabrication nest 70 for fabricating products 72. Products 72 may be fabricated from material 74 attached to work holding device 76.

Figure 5:
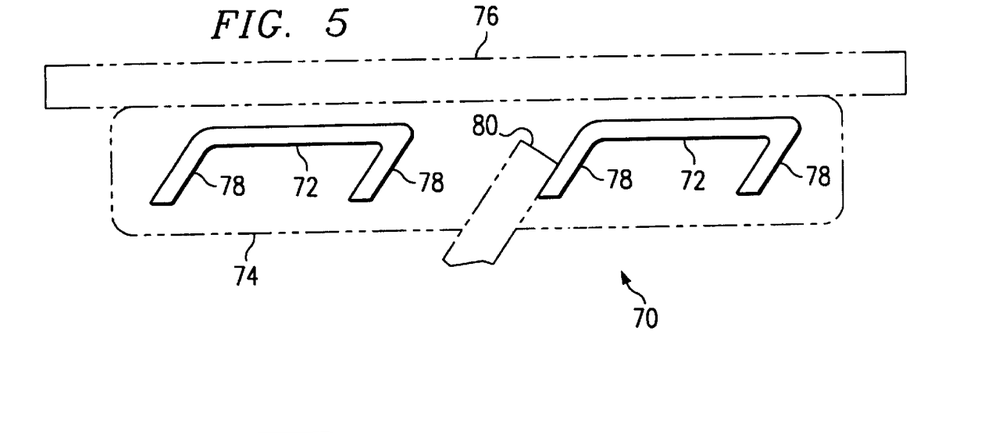
FIG. 5 is a cross section view of the fabrication nest illustrated in FIG. 4 taken along the line 5—5 of FIG. 4.

FIG. 5 is a cross section view of fabrication nest 70 taken along the line 5—5 of FIG. 4. In this example, nesting application 22 determines fabrication nest 70 using three-dimensional geometric characteristics of products 72. Nesting application 22 may access product information 26 to retrieve three-dimensional geometric characteristics of products 72. For example, products 72 may include angled upstanding legs 78. Two-dimensional projections of products 72 taken normal to work holding device 76 may result in a greater spacing of products 72 in fabrication nest 70, thereby reducing optimization of material 74. Thus, nesting application 22 may use the three-dimensional geometric characteristics of products 72 to determine fabrication nest 70 to provide efficient use of material 74.

Nesting application 22 may also use various work center constraints to determine fabrication nest 70. For example, a particular work center may have the capability of performing fabrication operations at a variety of axial orientations relative to material 74 using a variety of fabrication tools or equipment. Nesting application 22 may access work center information 28 to retrieve the work center constraints. For example, as illustrated in FIG. 5, a particular work center may have the capability of orienting a machining tool 80 relative to material 74 to produce angled legs 78 of products 72. Nesting application 22 may correlate the three-dimensional characteristics of products 72 with various work center constraints to determine fabrication nest 70 to provide efficient usage of material 74.

Figure 6:
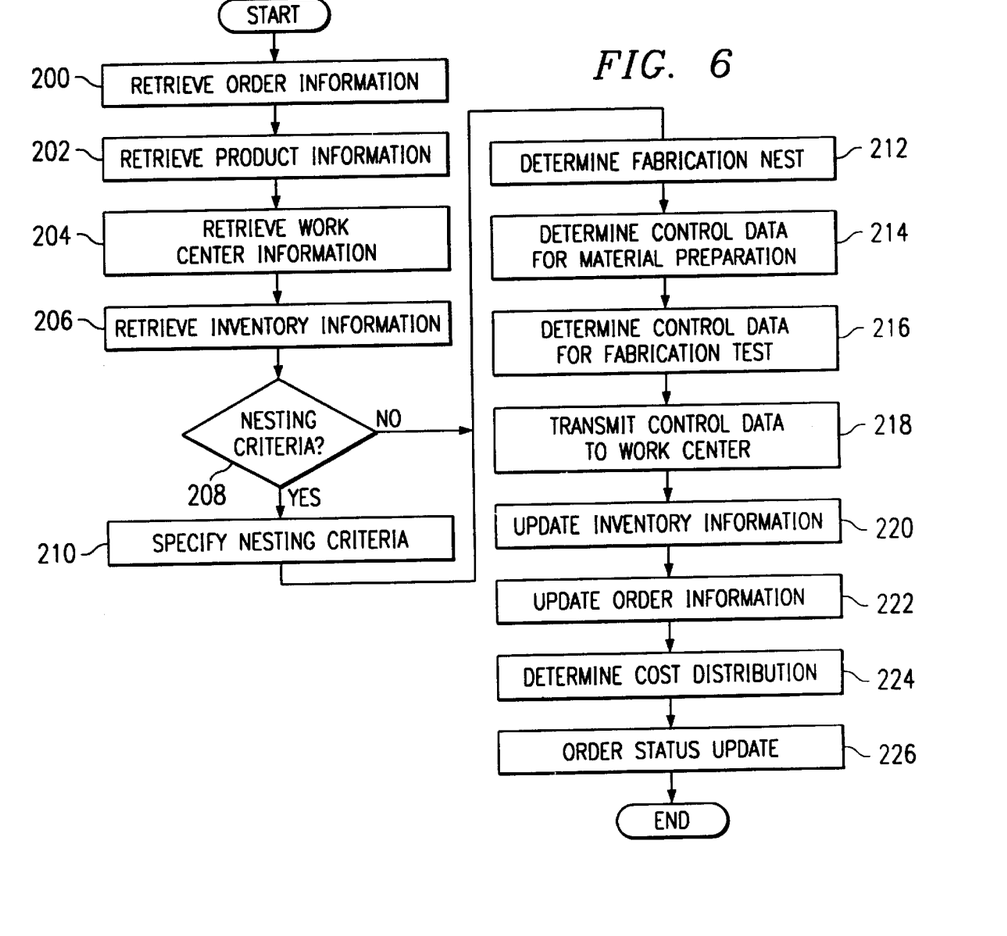
FIG. 6 is a flow chart of a method for material management in accordance with an embodiment of the present invention.

FIG. 6 is a flow chart of a method for material management in accordance with an embodiment of the present invention. The method begins at step 200 where processor 12 retrieves order information 24 for various products. As discussed above, order information 24 may include open work order requests and work order numbers for products, material codes associated with particular products, the quantity of products required, work center requirements for the products, scheduled completion dates for the products, charge numbers associated with the products, status information pertaining to open work order requests, and other types of order information pertaining to the products.

Processor 12 retrieves product information 26 for products to be fabricated at step 202. Product information 26 may include geometric data of the products, material requirements for the products, numerically controlled programming for fabricating each product, part numbers for the products, work center requirements for the products, revision or release information associated with the products, and other attribute or definition data associated with the products.

Processor 12 retrieves work center information 28 step 204. Work center information 28 may include constraints of tooling fixtures and holding devices, such as tooling hole locations and patterns, information pertaining to speed and feed rates of devices used for fabricating the products, and other information associated with work centers used for fabricating the products.

Processor 12 retrieves inventory information 30 at step 206. Inventory information 30 may include the alloy, temper, type, and gage of materials available or required for fabricating the products, the length, width, quantity, grain direction, and certification information of materials required for fabricating the products, and other information associated with materials for fabricating the products.

An operator of material management system 10 may have the option of modifying or selecting nesting criteria 32 at step 208. As discussed above, nesting criteria 32 may be used to designate primary considerations for determining a fabrication nest using nesting application 22. If the operator desires to select nesting criteria 32 for determining a fabrication nest, the method proceeds to step 210 where nesting criteria 32 is specified. If no nesting criteria 32 is to be specified, the method proceeds from step 208 to step 212 where nesting application 22 determines a fabrication nest for the products using order information 24, product information 26, work center information 28, or inventory information 30.

Material management system 10 may also be configured using predetermined nesting criteria 32, thereby omitting steps 208 and 210. For example, material management system 10 may be configured to automatically determine a fabrication nest using nesting application 22 using schedule requirements as nesting criteria 32. However, other suitable requirements may also be used as predetermined nesting criteria 32.

At step 212, nesting application 22 correlates order information 24, product information 26, work center information 28, and inventory information 30 to determine a fabrication nest for the products. Nesting application 22 determines preparation control data 38 for preparing the material used for the fabrication nest at step 214. For example, preparation control data 38 may include numerically controlled programming associated with milling the material to a particular thickness in anticipation of future fabrication processes.

Nest control data 40 for the fabrication nest is determined at step 216. For example, product information 26 may include numerically controlled programming for the fabrication of each product contained in the fabrication nest. Nesting application 22 may combine, concatenate, or create the numerically controlled programming for each of the products to determine numerically controlled programming for the fabrication nest. For example, nest control data 40 may include numerically controlled programming designating completion of all processing using a particular device prior to further processing requiring tooling changes, thereby minimizing costs associated with tooling or processing changes.

Control data determined for the fabrication nest is transmitted to a work center at step 218. For example, control data for the fabrication nest, such as preparation control data 38 and/or nest control data 40, may be transmitted to a work center for processing the fabrication nest. Control data may be automatically transmitted to a work center. Additionally, an operator of material management system 10 may also request control data for a fabrication nest using input device 14.

Processor 12 updates inventory information 30 at step 220. For example, nesting application 22 may designate a particular size or type of material for a fabrication nest. Inventory information 30 may be updated to reflect the particular type or size of material designated for use with the determined fabrication nest. Additionally, if the fabrication nest includes excess material not used in the fabrication nest, inventory information 30 may be updated to reflect the return of the excess material to inventory to be used for future fabrication nests.

Processor 12 updates order information 24 at step 222. For example, nesting application 22 may include one or more products having open work order requests in a fabrication nest to provide efficient usage of a particular type or size of material. Thus, processor 12 updates order information 24 to reflect inclusion of the products in the fabrication nest. Additionally, if a fabrication nest is modified to add or delete products, processor 12 updates order information 24 to reflect the products added or deleted from the fabrication nest.

Nesting application 22 determines cost distribution 36 for the fabrication nest at step 224. For example, cost distribution 36 may include a labor or production cost distribution and/or a material cost distribution for the products included in the fabrication nest. Nesting application 22 may be used to apportion costs associated with the material used for fabricating each product and the fabrication operations required to fabricate each product included in the fabrication nest. As discussed above, cost distribution 36 may be used to update order information 24. Cost distribution 36 may also be output to an operator of material management system 10 using output device 16. Thus, material management system 10 provides greater efficiency than prior material management systems by monitoring the material costs and the fabrication costs associated with fabricating each of the products included in the fabrication nest.

Processor 12 generates order status update 41 at step 226. As discussed above, after determination of a fabrication nest using nesting application 22, processor 12 may generate order status update 41. Order status update 41 may be used to automatically update inventory information 30 and order information 24. Additionally, order status update 41 may be used to update work center information 28, such as updating manufacturing schedules associated with each work center.

It will be understood that in this described method, certain steps may be omitted or accomplished in a sequence different from that depicted in FIG. 6. For example, step 226 of generating an order status update 41 might be accomplished between steps 212 and 214, just prior to step 214 of determining control data for material preparation. Also, it will be understood that the method depicted may be altered to encompass any of the other features or aspects of the invention as described elsewhere in the specification.

Although the present invention and its advantages have been described in detail, it should be understood that various changes, substitutions, and alterations can be made therein without departing from the spirit and scope of the present invention as defined by the appended claims.

What is claimed is:

1. A material management system comprising:
   a data storage device containing non-dimensional order information for a plurality of products, three-dimensional geometric characteristics of each of the products, work center information for fabricating each of the products, and inventory information for fabricating each of the products;

a processor coupled to the data storage system; and a nesting application operable for execution by the processor, the nesting application operable to determine a fabrication nest for the plurality of products using the non-dimensional order information, the three-dimensional geometric characteristics of each of the products, the work center information for fabricating each of the products, and the inventory information for fabricating each of the products.

2. The system of claim 1, wherein the product information comprises:

a material requirement for the product;

two-dimensional characteristics of the product; and numerically controlled programming information for fabricating the product.

3. The system of claim 1, wherein the processor is further operable to generate a cost distribution for each of the products using the fabrication nest.

4. The system of claim 3, wherein the cost distribution comprises:

a production cost distribution for each of the products; and a material cost distribution for each of the products.

5. The system of claim 1, wherein the processor is further operable to generate control data for fabricating each of the products using the fabrication nest.

6. The system of claim 5, wherein the control data comprises: preparation control data for preparing material for product fabrication; and nest control data for fabricating each of the products from the fabrication nest.

7. The system of claim 5, wherein the processor is further operable to transmit the control data to a work center for fabricating each of the products.

8. The system of claim 1, wherein the work center information comprises constraints of a holding device for restraining the material used for fabricating each of the products.

9. The system of claim 8, wherein the holding device constraints comprise hold-down locations of the holding device.

10. The system of claim 1, wherein the processor is further operable to generate an order status update for the fabrication nest.

11. The system of claim 1, wherein the product information comprises three-dimensional geometric characteristics of the product, and wherein the nesting application is operable to correlate the three-dimensional geometric characteristics of the product with the work center information to determine the fabrication nest.

12. The system of claim 1, wherein the inventory information comprises:

a length of the material available to fabricate each of the products;

a width of the material available for fabricating each of the products;

a grain direction of the material available for fabricating each of the products; and a quantity of the material available for fabricating each of the products.

13. A method for material management comprising:

retrieving non-dimensional order information for a plurality of products from a data storage device;

retrieving product information for each of the products from the storage device, the product information including three-dimensional geometric characteristics;

retrieving work center information for a work center for fabricating each of the products from the data storage device;

retrieving inventory information for fabricating each of the products from the data storage device; and determining a fabrication nest for the plurality of products using the non-dimensional order information, the product information for each of the products, the work center information for fabricating each of the products, and the inventory information for fabricating each of the products.

14. The method of claim 13, further comprising generating control data for the fabrication nest for fabricating each of the products using the fabrication nest.

15. The method of claim 14, wherein the generating control data step comprises:

generating preparation control data for preparing the material for product fabrication; and generating nest control data for fabricating each of the products from the fabrication nest.

16. The method of claim 14, further comprising transmitting the control data to a work center for fabricating each of the products.

17. The method of claim 13, further comprising generating a cost distribution for each of the products using the fabrication nest.

18. The method of claim 17, wherein the generating a cost distribution step comprises:

generating a production cost distribution for costs associated with fabricating each of the products; and generating a material cost distribution for material costs associated with fabricating each of the products.

19. The method of claim 13, wherein the retrieving product information step comprises retrieving three-dimensional geometric characteristics of the product.

20. The method of claim 13, wherein the retrieving work center information step comprises retrieving constraints for a holding device for securing the material for fabricating each of the products.

21. The method of claim 13, wherein the retrieving work center information comprises retrieving axial fabrication capabilities of the work center for fabricating each of the products.

22. The method of claim 13, wherein the retrieving inventory information step comprises:

retrieving a length of the material for fabricating each of the products;

retrieving a width of the material for fabricating each of the products;

retrieving a grain direction of the material for fabricating each of the products; and retrieving a quantity of the material for fabricating each of the products.

23. The method of claim 13, wherein retrieving product information comprises retrieving numerically controlled programming information for fabricating each of the products.

24. The method of claim 13, further comprising updating the inventory information to reflect material designated for the fabrication nest.

25. The method of claim 13, further comprising updating the order information to reflect products included in the fabrication nest.

26. The method of claim 13, further comprising determining numerically controlled programming information for the fabrication nest.

27. The method of claim 13, further comprising receiving nesting criteria for the fabrication nest.

28. A method for fabricating a plurality of products, comprising:

retrieving product information for each of the products from a data storage device, the product information including three-dimensional geometric characteristics;

selecting a work center for fabricating each of the products;

retrieving work center information for the selected work center from the data storage device;

retrieving inventory information for fabricating each of the products from the data storage device; and determining a fabrication nest for the plurality of products using the product information, the work center information, and the inventory information.

29. The method of claim 28, further comprising determining numerically controlled programming information for the fabrication nest.

30. The method of claim 28, wherein the retrieving product information step comprises:

retrieving material requirements for each of the products.

31. The method of claim 28, wherein the retrieving work center information step comprises retrieving constraints for a holding device for securing the material for fabricating the product.

32. The method of claim 31, wherein retrieving work center information comprises retrieving axial fabrication capabilities of the work center.

33. The method of claim 28, wherein the retrieving inventory information step comprises:

retrieving dimensions of the material for fabricating the product;

retrieving a grain direction of the material for fabricating the product; and retrieving a quantity of the material for fabricating the product.

34. The method of claim 28, further comprising selecting a nesting criteria for the fabrication nest.

35. The method of claim 34, wherein the selecting nesting criteria step comprises selecting a time period for determining a fabrication nest.

36. The method of claim 24, further comprising transmitting material order information to a material vendor based on the updated inventory information.

37. The method of claim 13, further comprising selecting a primary consideration for the fabrication nest before determining the fabrication nest, the primary consideration selected from the group consisting of the non-dimensional order information, the product information, the work center information, and the inventory information.

* * * * *